United States Patent
Chu et al.

(10) Patent No.: US 11,505,674 B2
(45) Date of Patent: *Nov. 22, 2022

(54) THERMOPLASTIC RESIN COMPOSITION AND MOLDED ARTICLE PRODUCED FROM SAME

(71) Applicant: LOTTE CHEMICAL CORPORATION, Seoul (KR)

(72) Inventors: Dong Hui Chu, Uiwang-si (KR); Gi Sun Kim, Uiwang-si (KR); Young Chul Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 16/648,813

(22) PCT Filed: Aug. 30, 2018

(86) PCT No.: PCT/KR2018/010015
§ 371 (c)(1),
(2) Date: Mar. 19, 2020

(87) PCT Pub. No.: WO2019/093636
PCT Pub. Date: May 16, 2019

(65) Prior Publication Data
US 2020/0216635 A1    Jul. 9, 2020

(30) Foreign Application Priority Data

Nov. 8, 2017 (KR) .................. 10-2017-0147949
Jun. 5, 2018 (KR) .................. 10-2018-0064628

(51) Int. Cl.
| | | |
|---|---|---|
| C08K 3/22 | (2006.01) | |
| C08K 7/14 | (2006.01) | |
| F24F 1/0025 | (2019.01) | |
| C08L 25/08 | (2006.01) | |
| C01G 9/02 | (2006.01) | |

(52) U.S. Cl.
CPC .............. C08K 3/22 (2013.01); C01G 9/02 (2013.01); C08K 7/14 (2013.01); *C01P 2002/60* (2013.01); *C01P 2004/61* (2013.01); *C08K 2003/2296* (2013.01); C08L 25/08 (2013.01); F24F 1/0025 (2013.01)

(58) Field of Classification Search
CPC .... C08L 25/12; C08K 7/14; C08K 2003/2296
See application file for complete search history.

(56) References Cited

U.S. PATENT DOCUMENTS

| | | |
|---|---|---|
| 3,041,303 A | 6/1962 | Nelson |
| 3,354,108 A | 11/1967 | Paradis et al. |
| 4,331,786 A | 5/1982 | Foy et al. |
| 4,356,300 A | 10/1982 | Isler |
| 4,612,340 A | 9/1986 | Ohachi |
| 5,151,457 A | 9/1992 | Ishida et al. |
| 5,714,534 A | 2/1998 | Kojima et al. |
| 5,714,545 A * | 2/1998 | Lee .................. C08L 23/12 525/193 |
| 5,906,679 A | 5/1999 | Watanabe et al. |
| 5,916,947 A | 6/1999 | Morris et al. |
| 6,166,116 A | 12/2000 | Sleeckx |
| 6,297,307 B1 | 10/2001 | Eichenauer et al. |
| 6,475,631 B1 | 11/2002 | Yamamoto et al. |
| 6,663,877 B1 | 12/2003 | Appleton et al. |
| 7,812,078 B2 | 10/2010 | Glasgow et al. |
| 8,128,998 B2 | 3/2012 | Li et al. |
| 9,150,701 B2 | 10/2015 | Destro et al. |
| 9,422,426 B2 | 8/2016 | Kwon et al. |
| 9,595,187 B2 | 3/2017 | Drovetskaya et al. |
| 10,058,489 B2 | 8/2018 | Drovetskaya et al. |
| 10,472,490 B2 | 11/2019 | Yang et al. |
| 10,472,510 B2 | 11/2019 | Lee et al. |
| 10,544,278 B2 | 1/2020 | Bae et al. |
| 10,787,532 B2 | 9/2020 | Kim et al. |
| 10,815,368 B2 | 10/2020 | Kim et al. |
| 10,829,628 B2 | 11/2020 | Yang et al. |
| 11,034,620 B2 | 6/2021 | Jeong et al. |
| 2002/0106413 A1 | 8/2002 | Herbst et al. |
| 2002/0109805 A1 | 8/2002 | Baba |

(Continued)

FOREIGN PATENT DOCUMENTS

| | | |
|---|---|---|
| CN | 1710153 A1 | 12/2005 |
| CN | 1858001 A | 11/2006 |

(Continued)

OTHER PUBLICATIONS

Machine translation of JP 11-035787 (1999, 13 pages).*
Zeomic (2020, 5 pages).*
STNext Abstract of JP 11-035787 (1999, 4 pages).*
Machine translation of CN 101787165 (2010, 6 pages).*
Machine translation of JP 10-213091 (1998, 10 pages).*
International Search Report in commonly owned International Application No. PCT/KR2017/015028 dated Mar. 30, 2018, pp. 1-4.
Extended Search Report in commonly owned European Application No. 17885334.7 dated Mar. 24, 2020, pp. 1-7.

(Continued)

*Primary Examiner* — Brieann R Johnston

(74) *Attorney, Agent, or Firm* — Additon, Pendleton & Witherspoon, P.A.

(57) ABSTRACT

The present invention is characterized by including an aromatic vinyl-based copolymer, glass fiber, and zinc oxide, wherein the zinc oxide has an average particle size (D50) of about 0.5 to 3 μm as measured by a particle size analyzer, and a size ratio (B/A) of peak B, spanning the range of 450 to 600 nm, to peak A, spanning the range of 370 to 390 nm, of about 0.01 to 1.0 when measuring photoluminescence. The thermoplastic resin composition exhibits excellent rigidity, antibacterial properties, weather resistance, external appearance and the like.

11 Claims, No Drawings

(56) References Cited

U.S. PATENT DOCUMENTS

| | | |
|---|---|---|
| 2003/0125413 A1 | 7/2003 | Herbst et al. |
| 2005/0043485 A1 | 2/2005 | Lee et al. |
| 2005/0131100 A1 | 6/2005 | Herbst et al. |
| 2006/0167138 A1 | 7/2006 | Ishii et al. |
| 2007/0009691 A1 | 1/2007 | Barre et al. |
| 2007/0049678 A1 | 3/2007 | Kim et al. |
| 2007/0100038 A1 | 5/2007 | Glasgow et al. |
| 2007/0197372 A1 | 8/2007 | Kurihara et al. |
| 2008/0071024 A1 | 3/2008 | Morishita |
| 2009/0068755 A1 | 3/2009 | Steeves et al. |
| 2009/0166593 A1 | 7/2009 | Kim et al. |
| 2010/0003179 A1 | 1/2010 | Katusic et al. |
| 2010/0264383 A1 | 10/2010 | Tooley et al. |
| 2011/0027386 A1 | 2/2011 | Kurihara et al. |
| 2013/0137810 A1 | 5/2013 | Shin |
| 2014/0017335 A1 | 1/2014 | Dimov |
| 2014/0296442 A1 | 10/2014 | Fiori et al. |
| 2015/0210835 A1 | 7/2015 | Tamura et al. |
| 2015/0237866 A1 | 8/2015 | Goudswaard et al. |
| 2015/0284559 A1 | 10/2015 | Tai |
| 2015/0360507 A1 | 12/2015 | Benito Lopez et al. |
| 2016/0326670 A1 | 11/2016 | Kang et al. |
| 2017/0190882 A1 | 7/2017 | Park et al. |
| 2017/0198132 A1 | 7/2017 | Choi et al. |
| 2018/0112056 A1* | 4/2018 | Yang .................... C08F 8/42 |
| 2018/0118914 A1 | 5/2018 | Bae et al. |
| 2018/0179314 A1 | 6/2018 | Kim et al. |
| 2018/0179373 A1 | 6/2018 | Kim et al. |
| 2018/0186989 A1 | 7/2018 | Lee et al. |
| 2018/0194164 A1 | 7/2018 | Benito Lopez et al. |
| 2019/0299572 A1 | 10/2019 | Hirabayashi |
| 2020/0115279 A1 | 4/2020 | Jeong et al. |
| 2020/0123057 A1 | 4/2020 | An et al. |
| 2020/0216635 A1 | 7/2020 | Chu et al. |
| 2021/0017371 A1 | 1/2021 | Yang et al. |
| 2021/0371654 A1 | 12/2021 | Bae et al. |

FOREIGN PATENT DOCUMENTS

| | | | |
|---|---|---|---|
| CN | 1919542 A | | 2/2007 |
| CN | 101001805 A | | 7/2007 |
| CN | 101466637 A | | 6/2009 |
| CN | 101787165 A | * | 7/2010 |
| CN | 101880426 A | | 11/2010 |
| CN | 103068766 A | | 4/2013 |
| CN | 104583329 A | | 4/2015 |
| CN | 104743602 A | | 7/2015 |
| CN | 105189069 A | | 12/2015 |
| CN | 105504567 A | | 4/2016 |
| CN | 106700461 A | | 5/2017 |
| CN | 106928862 A | | 7/2017 |
| CN | 107974030 A | | 5/2018 |
| EP | 1190622 A1 | | 3/2002 |
| EP | 1510549 A1 | | 3/2005 |
| EP | 3026082 A1 | | 6/2016 |
| EP | 3315546 A1 | | 5/2018 |
| EP | 3326975 A1 | | 5/2018 |
| EP | 3339367 A | | 6/2018 |
| EP | 3339370 A | | 6/2018 |
| EP | 3560902 A1 | | 10/2019 |
| FR | 1439417 A | | 5/1966 |
| GB | 1040287 A | | 8/1966 |
| JP | 55-133424 A | | 10/1980 |
| JP | 56-045419 A | | 4/1981 |
| JP | 62-53739 A | | 3/1987 |
| JP | 63278951 | | 11/1988 |
| JP | 06-287547 A | | 10/1994 |
| JP | 08-217936 A | | 8/1996 |
| JP | 08-253640 A | | 10/1996 |
| JP | 09-71727 A | | 3/1997 |
| JP | 09-157512 A | | 6/1997 |
| JP | 10-182927 A | | 7/1998 |
| JP | H10195309 A | | 7/1998 |
| JP | 10213091 A | * | 8/1998 |
| JP | 10-251444 A | | 9/1998 |
| JP | 11-035787 A | | 2/1999 |
| JP | 11-228844 A | | 8/1999 |
| JP | 11-263705 A | | 9/1999 |
| JP | 2001-010850 A | | 1/2001 |
| JP | 2001-220486 A | | 8/2001 |
| JP | 2002-21774 A | | 1/2002 |
| JP | 2002-068913 A | | 3/2002 |
| JP | 2002-087842 A | | 3/2002 |
| JP | 2003-212693 A | | 7/2003 |
| JP | 2003-280546 A | | 10/2003 |
| JP | 2005-239904 A | | 9/2005 |
| JP | 2006-182841 A1 | | 7/2006 |
| JP | 2007-191695 A | | 8/2007 |
| JP | 2008-230895 A | | 10/2008 |
| JP | 2009-513776 A | | 4/2009 |
| JP | 2009-161758 A | | 7/2009 |
| JP | 2009-173758 A | | 8/2009 |
| JP | 2011-506722 A | | 3/2011 |
| JP | 2011-137068 A | | 7/2011 |
| JP | 2014-172783 A | | 9/2014 |
| JP | 2014-221708 A | | 11/2014 |
| JP | 2015-189869 A | | 11/2015 |
| JP | 2016-121273 A | | 7/2016 |
| JP | 2017-132913 A | | 8/2017 |
| KR | 10-1999-0028477 A | | 4/1999 |
| KR | 10-0281656 | | 11/2001 |
| KR | 10-2002-0008203 A | | 1/2002 |
| KR | 10-0683505 B1 | | 2/2007 |
| KR | 10-0696385 B1 | | 3/2007 |
| KR | 10-2007-0047073 A | | 5/2007 |
| KR | 10-815472 B1 | | 3/2008 |
| KR | 10-0890796 A | | 3/2009 |
| KR | 10-2010-0076303 A | | 7/2010 |
| KR | 10-2010-0087603 A | | 8/2010 |
| KR | 10-2011-0052425 A | | 5/2011 |
| KR | 10-2012-0077313 A | | 7/2012 |
| KR | 10-1334283 B1 | | 11/2013 |
| KR | 10-2014-0009892 A | | 1/2014 |
| KR | 10-2014-0086729 A | | 7/2014 |
| KR | 10-1445304 B1 | | 9/2014 |
| KR | 10-1452020 A | | 10/2014 |
| KR | 10-2015-0017706 A | | 2/2015 |
| KR | 10-2016-0006969 A | | 1/2016 |
| KR | 10-2016-0083527 A | | 7/2016 |
| KR | 10-2017-0014647 A | | 2/2017 |
| KR | 10-2018-0071973 A | | 6/2018 |
| KR | 10-2010-0087603 A | | 8/2018 |
| RU | 2126775 C1 | | 2/1999 |
| WO | 97/01515 A1 | | 1/1997 |
| WO | 2018/117603 A1 | | 6/2018 |
| WO | 2018/124657 A1 | | 7/2018 |
| WO | 2019/021738 A1 | | 2/2019 |
| WO | 2019/066193 A1 | | 4/2019 |
| WO | 2019/093636 A1 | | 5/2019 |
| WO | 2019/132385 A1 | | 7/2019 |

OTHER PUBLICATIONS

Office Action in commonly owned Japanese Application No. 2019-530736 dated Aug. 4, 2020, pp. 1-4.
International Search Report in commonly owned International Application No. PCT/KR2018/006676 dated Oct. 30, 2018, pp. 1-4.
Prasanna et al., "Insight into the Mechanism of Antibacterial Activity of ZnO: Surface Defects Mediated Reactive Oxygen Species Even in the Dark", ACS Publications, Langmuir 2015, vol. 31, No. 33, pp. 9155-9162.
Office Action in commonly owned U.S. Appl. No. 16/470,317 dated Oct. 1, 2020, pp. 1-10.
International Search Report in counterpart International Application No. PCT/KR2018/010015 dated Feb. 1, 2019, pp. 1-4.
Vijayaraghavan, Rajagopala etc., "Insight into the Mechanism of Antibacterial activity of ZnO: surface defects mediated reactive oxygen species even in the dark", American Chemical Society, 2015, vol. 31, No. 33, p. 9155-9162.
Office Action in commonly owned Chinese Application No. 201880048166.7 dated May 10, 2021, pp. 1-7.
Office Action in commonly owned Korean Application No. 10-2016-0177857 dated Nov. 20, 2018, pp. 1-8.

(56) References Cited

OTHER PUBLICATIONS

Extended Search Report in commonly owned European Application No. 17210117.2, dated Apr. 30, 2018, pp. 1-5.
Search Report in commonly owned European Application No. 17210669.2 dated Apr. 20, 2018, pp. 1-5.
Office Action in commonly owned Korean Application No. 10-2016-0184170 dated Sep. 6, 2018, pp. 1-6.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, pp. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2.
Database WPI, Week 201654, Thomson Scientific, London, GB, Abstract of KR 2016-0083527 (Kolon Plastics Inc.), pp. 1-2.
Office Action in commonly owned U.S. Appl. No. 15/845,020 dated Aug. 8, 2019, pp. 1-13.
Machine translated English language equivalent of JP Application No. H09-212736, which is the same as publication JP 11-035787 (1999,10 pages).
Machine translated English language equivalent of CN 191542 (2007, 5 pages).
Office Action in commonly owned Chinese Application No. 201711062077.1 dated Jul. 12, 2019, pp. 1-7.
Office Action in commonly owned Chinese Application No. 201711007395.8 dated Jul. 31, 2019, pp. 1-6.
Extended Search Report in commonly owned European Application No. 17209267.8 dated Mar. 26, 2018, pp. 1-7.
Office Action in commonly owned U.S. Appl. No. 15/798,819 dated May 13, 2019, pp. 1-20.
Office Action in commonly owned Korean Application No. 10-2016-0176575 dated Nov. 1, 2018, pp. 1-7.
Google translation of JP 11035787 (1999, 8 pages).
Google translation of JP 06287547 (1994, 5 pages).
Office Action in commonly owned Japanese Application No. 2020-517362 dated Feb. 1, 2022, pp. 1-4.
Office Action in commonly owned U.S. Appl. No. 16/466,841 dated Jun. 1, 2020, pp. 1-14.
Office Action in commonly owned U.S. Appl. No. 15/845,020 dated Jan. 29, 2020, pp. 1-10.
Office Action in commonly owned U.S. Appl. No. 16/757,492 dated May 9, 2022, pp. 1-13.
Office Action in commonly owned U.S. Appl. No. 15/844,980 dated Sep. 11, 2019, pp. 1-5.
Final Office Action in commonly owned U.S. Appl. No. 15/844,980 dated Mar. 10, 2020, pp. 1-10.
Lakshmi et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015) and its supplementary materials (p. 6).
International Search Report in commonly owned International Application No. PCT/KR2018/006675 dated Sep. 27, 2018, pp. 1-4.
International Search Report in commonly owned International Application No. PCT/KR2017/015364 dated Apr. 16, 2018, pp. 1-4.
Office Action in commonly owned Chinese Application No. 201880072900.3 dated Dec. 3, 2021, pp. 1-6.
Extended Search Report in commonly owned European Application No. 18895611.4 dated Aug. 17, 2021, pp. 1-7.
Office Action in commonly owned Korean Application No. 10-2018-0142400 dated Sep. 18, 2020, pp. 1-6.
International Search Report in commonly owned International Application No. PCT/KR2018/016158 dated Mar. 20, 2019, pp. 1-6.
Office Action in counterpart Chinese Application No. 201880069060.5 dated Jul. 5, 2022, pp. 1-6.

\* cited by examiner

THERMOPLASTIC RESIN COMPOSITION AND MOLDED ARTICLE PRODUCED FROM SAME

CROSS-REFERENCE TO RELATED APPLICATIONS

This application claims priority to and the benefit of International Application No. PCT/KR2018/010015, filed Aug. 30, 2018, which published as WO 2019/093636 on May 16, 2019, Korean Patent Application No. 10-2017-0147949, filed in the Korean Intellectual Property Office on Nov. 8, 2017, and Korean Patent Application No. 10-2018-0064628, filed in the Korean Intellectual Property Office on Jun. 5, 2018, the entire disclosure of each of which is incorporated herein by reference.

TECHNICAL FIELD

The present invention relates to a thermoplastic resin composition and a molded article manufactured using the same. More particularly, the present invention relates to a thermoplastic resin composition for cross-flow fans of air conditioners, which has good rigidity, antibacterial properties, weather resistance, and appearance characteristics, and a molded article manufactured using the same.

BACKGROUND ART

Recently, with increasing interest in personal health and hygiene and increasing income level, there is increasing demand for thermoplastic resin products having antibacterial and hygienic functions. Accordingly, there is an increasing number of thermoplastic resin products subjected to antibacterial treatment to remove or inhibit bacterial growth on surfaces of household goods and electronic products. Therefore, development of a functional antibacterial material having stability and reliability (an antibacterial thermoplastic resin composition) is a very important challenge.

An interior of an air conditioner consists of a heat exchanger generating cold water vapor, a filter filtering out dust, a cross-flow fan creating a current of air to blow out cold air, a ventilation path, and the like. The interior of the air conditioner, which is at high humidity and is partially blocked from the outside environment, is susceptible to mold or bacterial growth.

Among the internal components of the air conditioner, the filter and the ventilation path can secure antibacterial properties using stainless steel materials or plasma sterilization. In contrast, since the cross-flow fan requires both antibacterial properties and mechanical properties such as high rigidity, it is difficult to find a material suitable for the cross-flow fan.

Inorganic antibacterial agents containing metals, such as silver (Ag) and copper (Cu), are sometimes used in manufacture of the cross-flow fan. However, since such inorganic antibacterial agents need to be used in large amounts due to low antibacterial activity and have disadvantages of relatively high price, difficulty in uniform dispersion upon processing, and discoloration due to the metal components, the inorganic antibacterial agents are used in a limited range of applications.

Therefore, there is a need for a thermoplastic resin composition which can provide good rigidity, antibacterial properties, weather resistance (discoloration resistance), and appearance characteristics.

The background technique of the present invention is disclosed in Japanese Patent Publication No. 2002-21774 and the like.

DISCLOSURE

Technical Problem

It is one aspect of the present invention is to provide a thermoplastic resin composition which has good rigidity, antibacterial properties, weather resistance, and appearance characteristics.

It is another aspect of the present invention to provide a molded article formed of the thermoplastic resin composition set forth above.

The above and other aspects of the present invention will become apparent from the detailed description of the following embodiments.

Technical Solution

One aspect of the present invention relates to a thermoplastic resin composition. The thermoplastic resin composition includes: an aromatic vinyl copolymer resin; glass fibers; and zinc oxide, wherein the zinc oxide has an average particle diameter (D50) of about 0.5 µm to about 3 µm, as measured using a particle size analyzer, and a peak intensity ratio (B/A) of about 0.01 to about 1.0, where A indicates a peak in the wavelength range of 370 nm to 390 nm and B indicates a peak in the wavelength range of 450 nm to 600 nm in photoluminescence measurement.

In one embodiment, the thermoplastic resin composition may include: about 100 parts by weight of the aromatic vinyl copolymer resin; about 5 parts by weight to about 40 parts by weight of the glass fibers; and about 0.1 parts by weight to about 20 parts by weight of the zinc oxide.

In one embodiment, the aromatic vinyl copolymer resin may be a polymer of an aromatic vinyl monomer and a monomer copolymerizable with the aromatic vinyl monomer.

In one embodiment, the zinc oxide may have a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

In one embodiment, the zinc oxide may be prepared by melting zinc in a reactor, heating the molten zinc to about 850° C. to about 1,000° C. to vaporize the molten zinc, injecting oxygen gas into the reactor, cooling the reactor to about 20° C. to about 30° C., and heating the reactor to about 400° C. to about 900° C. for about 30 minutes to about 150 minutes.

In one embodiment, the zinc oxide may have a BET specific surface area of about 10 m$^2$/g or less, as measured by a nitrogen gas adsorption method using a BET analyzer.

In one embodiment, the thermoplastic resin composition may have a color variation (ΔE) of about 0.1 to about 2.0, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 3,000 hours in accordance with ASTM D4459:

$$\text{Color variation } (\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between $L^*$ values before and after testing, $\Delta a^*$ is a difference ($a_1^* - a_0^*$) between $a^*$ values before and after testing, and $\Delta b^*$ is a difference ($b_1^* - b_0^*$) between $b^*$ values before and after testing.

In one embodiment, the thermoplastic resin composition may have an antibacterial activity of about 2 to about 7 against *Staphylococcus aureus* and an antibacterial activity of about 2 to about 7 against *Escherichia coli*, as calculated according to Equation 3 after inoculation of 5 cm×5 cm specimens with *Staphylococcus aureus* and *Escherichia coli*, respectively, and culturing under conditions of 35° C. and 90% RH for 24 hours in accordance with JIS Z 2801:

$$\text{Antibacterial activity} = \log(M1/M2) \quad \text{[Equation 3]}$$

where M1 is the number of bacteria as measured on a blank specimen after culturing for 24 hours and M2 is the number of bacteria as measured on each of the specimens of the thermoplastic resin composition after culturing for 24 hours.

In one embodiment, the thermoplastic resin composition may have a flexural modulus of about 74,000 kgf/cm² or more, as measured on a 6.4 mm thick specimen at a strain rate of 2.8 mm/min in accordance with ASTM D790.

In one embodiment, the thermoplastic resin composition may have a structure in which the glass fibers and the zinc oxide are present as a dispersed phase in the aromatic vinyl copolymer resin as a continuous phase, and a ratio of average particle diameter (D50) of the zinc oxide to diameter of the glass fibers may range from about 1:1.7 to about 1:200.

Another aspect of the present invention relates to a molded article. The molded article is formed of the thermoplastic resin composition set forth above.

In one embodiment, the molded article may be a cross-flow fan of an air conditioner.

Advantageous Effects

The present invention provides a thermoplastic resin composition which has good rigidity, antibacterial properties, weather resistance, and appearance characteristics, and a molded article formed of the same.

Best Mode

Hereinafter, exemplary embodiments of the present invention will be described in detail.

A thermoplastic resin composition according to the present invention includes: (A) an aromatic vinyl copolymer resin; (B) glass fibers; and (C) zinc oxide.

(A) Aromatic Vinyl Copolymer Resin

The aromatic vinyl copolymer resin according to one embodiment of the present invention may be an aromatic vinyl copolymer resin used in typical thermoplastic resin composition for cross-flow fans of air conditioners. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be obtained by mixing the aromatic vinyl monomer with the monomer copolymerizable with the aromatic vinyl monomer, followed by polymerization of the mixture. Here, the polymerization may be performed by any suitable polymerization method known in the art, such as emulsion polymerization, suspension polymerization, and mass polymerization.

In some embodiments, the aromatic vinyl monomer may include styrene, α-methyl styrene, β-methylstyrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 20 wt % to about 90 wt %, for example, about 30 wt % to about 80 wt %, based on the total weight of the aromatic vinyl copolymer resin. Within this range, the thermoplastic resin composition can have good impact resistance and flowability.

In some embodiments, the monomer copolymerizable with the aromatic vinyl monomer may include, for example, vinyl cyanide monomers, such as acrylonitrile, methacrylonitrile, ethacrylonitrile, phenylacrylonitrile, α-chloroacrylonitrile, and fumaronitrile, (meth)acrylic acids and alkyl esters thereof, maleic anhydride, and N-substituted maleimide. These may be used alone or as a mixture thereof. The monomer copolymerizable with the aromatic vinyl monomer may be present in an amount of about 10 wt % to about 80 wt %, for example, about 20 wt % to about 70 wt %, based on the total weight of the aromatic vinyl copolymer resin. Within this range, the thermoplastic resin composition can have good impact resistance and flowability.

In some embodiments, the aromatic vinyl copolymer resin may have a weight average molecular weight (Mw) of about 10,000 g/mol to about 300,000 g/mol, for example, about 20,000 g/mol to about 200,000 g/mol, as measured by gel permeation chromatography (GPC). Within this range, the thermoplastic resin composition can have good mechanical strength and moldability.

In addition, the aromatic vinyl copolymer resin may be a mixture of at least two aromatic vinyl copolymer resins having different weight average molecular weights. For example, the aromatic vinyl copolymer resin may be a mixture of a first aromatic vinyl copolymer resin having a weight average molecular weight (Mw) of about 10,000 g/mol to about 100,000 g/mol and a second aromatic vinyl copolymer resin having a weight average molecular weight (Mw) of greater than about 100,000 g/mol and less than or equal to about 300,000 g/mol.

(B) Glass Fibers

The glass fibers according to one embodiment of the present invention serve to improve mechanical properties of the thermoplastic resin composition, such as rigidity, and may be glass fibers used in typical thermoplastic resin compositions for cross-flow fans of air conditioners.

In some embodiments, the glass fibers may have various shapes, such as fibrous, particle, rod-like, needle-like, and flake shapes, and may have various cross-sections, such as circular, elliptical, and rectangular cross-sections. For example, it may be desirable to use fibrous glass fibers having circular and/or rectangular cross-sections in terms of mechanical properties.

In some embodiments, the circular cross-section glass fibers may have a cross-sectional diameter of about 5 μm to about 20 μm and a pre-processing length of about 2 mm to about 20 mm, and the rectangular cross-section glass fibers may have a cross-sectional aspect ratio of about 1.5 to about 10 and a pre-processing length of about 2 mm to about 20 mm. Within this range, the thermoplastic resin composition can have good rigidity and processability.

In some embodiments, the glass fibers may be present in an amount of about 5 parts by weight to about 40 parts by weight, for example, about 10 parts by weight to about 30 parts by weight, specifically about 15 parts by weight to about 25 parts by weight, relative to about 100 parts by weight of the thermoplastic resin. Within this range, the thermoplastic resin composition can have good mechanical properties, appearance characteristics, weather resistance, and antibacterial properties.

(C) Zinc Oxide

The zinc oxide according to one embodiment of the present invention serves to improve weather resistance and antibacterial properties of the thermoplastic resin composition, and may have a peak intensity ratio (B/A) of about 0.01 to about 1.0, for example, about 0.1 to about 1.0, specifically about 0.2 to about 0.7, where A indicates a peak in the wavelength range of 370 nm to 390 nm and B indicates a peak in the wavelength range of 450 nm to 600 nm in photoluminescence measurement. If the peak intensity ratio (B/A) of the zinc oxide is less than about 0.01, the thermoplastic resin composition can have poor antibacterial properties. If the peak intensity ratio (B/A) of the zinc oxide exceeds about 1.0, there can be a significant difference between initial colors of the thermoplastic resin and the thermoplastic resin composition and the thermoplastic resin can have poor weather resistance.

In some embodiments, the zinc oxide may have various shapes, for example, a spherical shape, a plate-like shape, a rod-like shape, and combinations thereof. In addition, the zinc oxide may have an average particle diameter (D50) of about 0.5 μm to about 3 μm, for example, about 0.8 μm to about 3 μm, as measured in a single particle state (not forming a secondary particle through agglomeration of particles) using a particle size analyzer (Laser Diffraction Particle Size Analyzer LS I3 320, Beckman Coulter Co., Ltd.). If the average particle diameter (D50) of the zinc oxide is outside this range, the thermoplastic resin composition can have poor discoloration resistance and weather resistance.

In some embodiments, the zinc oxide may have a peak position degree (2θ) in the range of about 35° to about 37° and a crystallite size of about 1,000 Å to about 2,000 Å, for example, about 1,200 Å to about 1,800 Å, in X-ray diffraction (XRD) analysis, as calculated by Scherrer's equation (Equation 1) with reference to a measured FWHM value (full width at half maximum of a diffraction peak). Within this range, the thermoplastic resin composition can have good initial color, weather resistance (discoloration resistance), antibacterial properties, and balance between mechanical properties.

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

In some embodiments, the zinc oxide may have a BET specific surface area of about 10 m²/g or less, for example, about 1 m²/g to about 7 m²/g, as measured by a nitrogen gas adsorption method using a BET analyzer (Surface Area and Porosity Analyzer ASAP 2020, Micromeritics Co., Ltd.), and a purity of about 99% or more. Within this range, the thermoplastic resin composition can have good discoloration resistance and mechanical properties.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., and heating the reactor to about 400° C. to about 900° C., for example, 500° C. to about 800° C., for about 30 minutes to about 150 minutes, for example, about 60 minutes to about 120 minutes.

In some embodiments, the zinc oxide may be present in an amount of about 0.1 parts by weight to about 20 parts by weight, for example, about 0.5 parts by weight to about 10 parts by weight, specifically about 1 part by weight to about 5 parts by weight, relative to about 100 parts by weight of the thermoplastic resin. Within this range, the thermoplastic resin composition can have good weather resistance, antibacterial properties, mechanical properties, and appearance characteristics.

The thermoplastic resin composition according to one embodiment of the present invention may further include additives used in typical thermoplastic resin compositions. Examples of the additives may include flame retardants, fillers, antioxidants, anti-dripping agents, lubricants, release agents, nucleating agents, antistatic agents, pigments, dyes, and combinations thereof, without being limited thereto. When used in the thermoplastic resin composition, the additives may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition according to the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a structure in which the glass fibers and the zinc oxide are present as a dispersed phase in the aromatic vinyl copolymer resin as a continuous phase, and a ratio of average particle diameter (D50) of the zinc oxide to diameter of the glass fibers may range from about 1:1.7 to about 1:200, for example, about 1:2 to about 1:20. Within this range, the thermoplastic resin composition can have good rigidity and creep properties.

In some embodiments, the thermoplastic resin composition may have a color variation (ΔE) of about 0.1 to about 2.0, for example, about 0.5 to about 1.0, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 3,000 hours in accordance with ASTM D4459.

$$\text{Color Variation } (\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after testing, Δa* is a difference ($a_1^* - a_0^*$) between a* values before and after testing, and Δb* is a difference ($b_1^* - b_0^*$) between b* values before and after testing.

Here, Δa* may range from about 1.0 to about 1.5. If Δa* is outside of this range in evaluation of weather resistance, weather resistance (discoloration resistance) of the thermoplastic resin composition can be greatly deteriorated to the extent that a change in color of the composition is apparent to the naked eye.

In some embodiments, the thermoplastic resin composition has an antibacterial effect against various bacteria such as *Staphylococcus aureus, Escherichia coli, Bacillus subtilis, Pseudomonas aeruginosa, Salmonella, Pneumococcus,* and methicillin-resistant *Staphylococcus Aureus* (MRSA), and may have an antibacterial activity of about 2 to about 7, for example, about 3 to about 6, against *Staphylococcus aureus* and an antibacterial activity of about 2 to about 7, for example, about 3 to about 6, against *Escherichia coli,* as calculated according to Equation 3 after inoculation of 5 cm×5 cm specimens with *Staphylococcus aureus* and *Escherichia coli,* respectively, and culturing under conditions of 35° C. and 90% RH for 24 hours in accordance with JIS Z 2801.

$$\text{Antibacterial activity} = \log(M1/M2) \quad \text{[Equation 3]}$$

where M1 is the number of bacteria as measured on a blank specimen after culturing for 24 hours and M2 is the number of bacteria as measured on each of the specimens of the thermoplastic resin composition after culturing for 24 hours.

Here, the "blank specimen" refers to a control specimen for comparison with a test specimen (specimen of the thermoplastic resin composition). Specifically, the blank specimen is prepared by inoculating bacteria on an empty petri dish, which is suitable for checking whether the inoculated bacteria grow normally, followed by culturing for 24 hours under the same conditions as the test specimen. Antibacterial performance of the test specimen is evaluated based on comparison of the number of cultured bacteria between the blank specimen and the test specimen. Here, the "number of cultured bacteria" may be determined through a process in which each specimen is inoculated with the bacteria, followed by culturing for 24 hours, and then an inoculation solution of the bacteria is recovered and diluted, followed by growth of the bacteria to a colony on a culture dish. When population of the colony is too large to count, the number of cultured bacteria may be determined by dividing the colony divided into multiple sectors, measuring the population size of one sector, and converting the measured value into total population.

In some embodiments, the thermoplastic resin composition may have a flexural modulus of about 74,000 kgf/cm$^2$ or more, for example, about 74,500 kgf/cm$^2$ to about 80,000 kgf/cm$^2$, as measured on a 6.4 mm thick specimen at a strain rate of 2.8 mm/min in accordance with ASTM D790.

A molded article according to the present invention is formed of the thermoplastic resin composition set forth above. The thermoplastic resin composition may be prepared in pellet form. The prepared pellets may be produced into various molded articles (products) by various molding methods such as injection molding, extrusion, vacuum molding, and casting. These molding methods are well known to those skilled in the art. The molded article according to the present invention has good rigidity, antibacterial properties, weather resistance, appearance characteristics, and balance therebetween and thus is useful as a material for cross-flow fans of air conditioners.

Mode for Invention

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Aromatic Vinyl Copolymer Resin (A-1) A SAN resin (weight average molecular weight: 80,000 g/mol) obtained by polymerization of 68 wt % of styrene and 32 wt % of acrylonitrile was used.

(A-2) A SAN resin (weight average molecular weight: 150,000 g/mol) obtained by polymerization of 68 wt % of styrene and 32 wt % of acrylonitrile was used.

(B) Glass Fibers

Circular cross-section glass fibers having a cross-sectional diameter of 13 μm and a pre-processing length of 3 mm were used.

(C) Zinc Oxide (C1) Metallic zinc was melted in a reactor, followed by heating to 900° C. to vaporize the molten zinc, and then oxygen gas was injected into the reactor, followed by cooling to room temperature (25° C.) to obtain an intermediate. Then, the intermediate was subjected to heat treatment at 700° C. for 90 minutes, followed by cooling to room temperature (25° C.), thereby preparing zinc oxide (C1). For the prepared zinc oxide, average particle diameter, BET surface area, purity, peak intensity ratio (B/A) of peak B in the wavelength range of 450 nm to 600 nm to peak A in the wavelength range of 370 nm to 390 nm in photoluminescence measurement, and crystallite size were measured. Results are shown in Table 1.

(C2) Zinc oxide (Manufacturer: Ristecbiz Co., Ltd., product name: RZ-950) was used.

(D) Antibacterial Agent

A silver (Ag) antibacterial agent (manufacturer: TOA GOSEI Co., Ltd., product name: NOVARON AGZ010) was used.

TABLE 1

|  | (C1) Zinc oxide | (C2) Zinc oxide |
|---|---|---|
| Average particle diameter (μm) | 1.2 | 1.1 |
| BET surface area (m$^2$/g) | 4 | 15 |
| Purity (%) | 99 | 97 |
| PL peak intensity ratio (B/A) | 0.28 | 9.8 |
| Crystallite size (Å) | 1417 | 503 |

Property Evaluation (1) Average particle diameter (unit: μm): Average particle diameter (volume average) was measured using a particle size analyzer (Laser Diffraction Particle Size Analyzer LS 13 320, Beckman Coulter Co., Ltd.).

(2) BET surface area (unit: m$^2$/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He-Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size }(D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

Examples 1 to 2 and Comparative Examples 1 to 3

The aforementioned components were mixed in amounts as listed in Tables 2 and 3, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 2.

Property Evaluation (1) Weather resistance (color variation (ΔE)): For determination of color variation, initial color values ($L_0^*$, $a_0^*$, $b_0^*$) were measured on an injection molded specimen having a size of 50 mm×90 mm×3 mm using a colorimeter (KONICA MINOLTA CM-3700A), followed by testing for 3,000 hours in accordance with ASTM D4459, and then color values ($L_1^*$, $a_1^*$, $b_1^*$) of the specimen were measured in the same manner as above. Thereafter, color variation (ΔE) was calculated according to Equation 2:

$$\text{Color variation }(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after testing, Δa* is a difference ($a_1^* - a_0^*$) between a* values before and after testing, and Δb* is a difference ($b_1^* - b_0^*$) between b* values before and after testing.

(2) Antibacterial activity: In accordance with JIS Z 2801, 5 cm×5 cm specimens were inoculated with *Staphylococcus aureus* and *Escherichia coli*, respectively, and then subjected to culturing under conditions of 35° C. and 90% RH for 24 hours, followed by calculation of antibacterial activity according to Equation 3:

$$\text{Antibacterial activity} = \log(M1/M2) \quad \text{[Equation 3]}$$

where M1 is the number of bacteria as measured on a blank specimen after culturing for 24 hours and M2 is the number of bacteria as measured on each of the specimens after culturing for 24 hours.

(3) Flexural modulus (FM, unit: kgf/cm$^2$): Flexural modulus was measured on a 6.4 mm thick specimen at a strain rate of 2.8 mm/min in accordance with ASTM D790.

(4) Heat deflection temperature (HDT, unit: ° C.): Heat deflection temperature was measured at a heating rate of 120 ° C./hr under a load of 1.8 MPa in accordance with ASTM D648.

(5) Appearance: A specimen having a size of 90 mm×50 mm×2.5 mm was prepared, and then the presence of flow marks was observed with the naked eye. When there are no flow marks, the corresponding thermoplastic resin composition can be evaluated as having good compatibility.

(6) Creep: In accordance with ASTM D638, displacement length (unit: mm) of a tensile strength test specimen under conditions of 85° C., 100 N, and 100 hours was measured.

TABLE 2

|  |  | Example | | Comparative Example | | |
|---|---|---|---|---|---|---|
|  |  | 1 | 2 | 1 | 2 | 3 |
| (A) | (A1) | 37.5 | 37.5 | 37.5 | 37.5 | 37.5 |
| (wt %) | (A2) | 62.5 | 62.5 | 62.5 | 62.5 | 62.5 |
| (B) (parts by weight) | | 20 | 20 | 20 | 20 | 20 |
| (C1) (parts by weight) | | 2 | 4 | — | — | — |
| (C2) (parts by weight) | | — | — | 4 | — | — |
| (D) (parts by weight) | | — | — | — | 4 | — |
| Color variation (ΔE) | | 1.0 | 0.5 | 3.0 | 3.5 | 3.5 |
| Antibacterial activity (*Escherichia coli*) | | 4 | 6 | 1.5 | 1 | 1 |
| Antibacterial activity (*Staphylococcus aureus*) | | 3 | 4 | 1.5 | 1 | 1 |
| Flexural modulus (kgf/cm$^2$) | | 7,5000 | 7,6000 | 74,000 | 75,000 | 74,000 |
| Heat deflection temperature (° C.) | | 107 | 107 | 106 | 104 | 105 |
| Appearance (flow mark) | | X | X | O | O | X |
| Creep (mm) | | 0.16 | 0.16 | 0.17 | 0.17 | 0.17 |

*Parts by weight: relative to 100 parts by weight of the aromatic vinyl copolymer resin (A).

From the results shown in Table 2, it can be seen that the thermoplastic resin composition according to the present invention had good properties in terms of rigidity (flexural modulus), antibacterial effects (antibacterial activity), weather resistance (color variation (ΔE)), heat resistance (heat deformation temperature), and appearance (flow mark, creep).

Conversely, the thermoplastic resin composition of Comparative Example 1, using the zinc oxide (C2) having a PL peak intensity ratio (B/A) of 9.8 (exceeding 1.0) instead of the zinc oxide according to the present invention, and the thermoplastic resin composition of Comparative Example 2, using the silver antibacterial agent, exhibited poor properties in terms of weather resistance, appearance, and antibacterial effects. In addition, the thermoplastic resin composition of Comparative Example 3, free from zinc oxide, exhibited poor properties in terms of weather resistance and antibacterial effects.

It should be understood that various modifications, changes, alterations, and equivalent embodiments can be made by those skilled in the art without departing from the spirit and scope of the invention.

The invention claimed is:

1. A thermoplastic resin composition comprising:
an aromatic vinyl copolymer resin;
glass fibers; and
zinc oxide,
wherein the zinc oxide has an average particle diameter (D50) of about 0.5 μm to about 3 μm, as measured using a particle size analyzer, and a peak intensity ratio (B/A) of about 0.01 to about 1.0, where A indicates intensity of the peak in the wavelength range of 370 nm to 390 nm and B indicates intensity of the peak in the wavelength range of 450 nm to 600 nm in photoluminescence measurement, and
wherein the thermoplastic resin composition has a color variation (ΔE) of about 0.1 to about 2.0, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 3,000 hours in accordance with ASTM D4459:

$$\text{Color Variation } (\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

2. The thermoplastic resin composition according to claim 1, comprising: about 100 parts by weight of the aromatic vinyl copolymer resin; about 5 parts by weight to about 40 parts by weight of the glass fibers; and about 0.1 parts by weight to about 20 parts by weight of the zinc oxide.

3. The thermoplastic resin composition according to claim 1, wherein the aromatic vinyl copolymer resin is a polymer of an aromatic vinyl monomer and a monomer copolymerizable with the aromatic vinyl monomer.

4. The thermoplastic resin composition according to claim 1, wherein the zinc oxide has a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

5. The thermoplastic resin composition according to claim 1, wherein the zinc oxide is prepared by melting zinc in a reactor, heating the molten zinc to about 850° C. to about 1,000° C. to vaporize the molten zinc, injecting oxygen gas into the reactor, cooling the reactor to about 20° C. to about 30° C., and heating the reactor to about 400° C. to about 900° C. for about 30 minutes to about 150 minutes.

6. The thermoplastic resin composition according to claim 1, wherein the zinc oxide has a BET specific surface area of about 10 m²/g or less, as measured by a nitrogen gas adsorption method using a BET analyzer.

7. The thermoplastic resin composition according to claim 1, wherein the thermoplastic resin composition has an antibacterial activity of about 2 to about 7 against *Staphylococcus aureus* and an antibacterial activity of about 2 to about 7 against *Escherichia coli*, as calculated according to Equation 3 after inoculation of 5 cm×5 cm specimens with *Staphylococcus aureus* and *Escherichia coli*, respectively, and culturing under conditions of 35° C. and 90% RH for 24 hours in accordance with JIS Z 2801:

$$\text{Antibacterial activity} = \log(M1/M2) \quad \text{[Equation 3]}$$

where M1 is the number of bacteria as measured on a blank specimen after culturing for 24 hours and M2 is the number of bacteria as measured on each of the specimens of the thermoplastic resin composition after culturing for 24 hours.

8. The thermoplastic resin composition according to claim 1, wherein the thermoplastic resin composition has a flexural modulus of about 74,000 kgf/cm² or more, as measured on a 6.4 mm thick specimen at a strain rate of 2.8 mm/min in accordance with ASTM D790.

9. The thermoplastic resin composition according to claim 1, wherein the thermoplastic resin composition has a structure in which the glass fibers and the zinc oxide are present as a dispersed phase in the aromatic vinyl copolymer resin as a continuous phase, and a ratio of average particle diameter (D50) of the zinc oxide to diameter of the glass fibers ranges from about 1:1.7 to about 1:200.

10. A molded article formed of the thermoplastic resin composition according to claim 1.

11. The molded article according to claim 10, wherein the molded article is a cross-flow fan of an air conditioner.

* * * * *